:

US010516652B1

(12) United States Patent
Hashmi et al.

(10) Patent No.: US 10,516,652 B1
(45) Date of Patent: Dec. 24, 2019

(54) SECURITY ASSOCIATION MANAGEMENT (71) Applicant: AMAZON TECHNOLOGIES, INC., Seattle, WA (US)

(72) Inventors: Omer Hashmi, Chevy Chase, MD (US); Andrew Hemstreet Redmon, Fairfax, VA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 15/445,459

(22) Filed: Feb. 28, 2017

(51) Int. Cl.
  *H04L 29/06* (2006.01)
  *G06F 9/455* (2018.01)
(52) U.S. Cl.
  CPC ...... *H04L 63/0428* (2013.01); *G06F 9/45533* (2013.01); *H04L 63/061* (2013.01)
(58) Field of Classification Search
  CPC .......................... G06F 21/602; H04L 63/0272
  USPC .................................................. 713/150–155
  See application file for complete search history.

(56) References Cited

U.S. PATENT DOCUMENTS

| 9,148,414 B1* | 9/2015 | Roth .................. H04L 63/08 |
| 9,288,208 B1* | 3/2016 | Roth .................. H04L 63/0884 |
| 9,813,379 B1* | 11/2017 | Shevade ............. H04L 63/0272 |
| 9,942,787 B1* | 4/2018 | Tillotson ............... H04W 24/08 |
| 10,003,607 B1* | 6/2018 | Kolman .............. H04L 63/0272 |
| 10,313,225 B1* | 6/2019 | Shevade ................. H04L 45/14 |
| 2013/0166332 A1* | 6/2013 | Hammad ............... G06Q 40/10 705/5 |
| 2013/0311778 A1* | 11/2013 | Cherukuri ........... H04L 63/0272 713/171 |
| 2014/0019352 A1* | 1/2014 | Shrivastava ........ G06Q 20/3674 705/41 |
| 2016/0080424 A1* | 3/2016 | Hasegawa ............. H04W 12/00 726/1 |
| 2016/0255050 A1* | 9/2016 | Grayson ............... H04L 63/029 726/1 |
| 2016/0267150 A1* | 9/2016 | Gubau I Forne .... G06Q 30/018 |
| 2016/0380984 A1* | 12/2016 | Johnson .............. H04L 63/0485 713/153 |
| 2017/0063808 A1* | 3/2017 | Manapragada ..... H04L 67/2804 |
| 2017/0302629 A1* | 10/2017 | El-Moussa .............. G06F 21/53 |
| 2017/0346807 A1* | 11/2017 | Blasi ................... H04L 63/0807 |
| 2018/0212999 A1* | 7/2018 | Kassimis ................ H04L 63/20 |
| 2018/0213472 A1* | 7/2018 | Ishii ........................ H04M 3/00 |

\* cited by examiner

*Primary Examiner* — Lynn D Feild
*Assistant Examiner* — Viral S Lakhia
(74) *Attorney, Agent, or Firm* — Blank Rome LLP (57) ABSTRACT

A system (and method) includes a plurality of compute devices configured to execute an endpoint node and a provisioning service. The endpoint node is configured to establish an encrypted communication channel over a public network. The provisioning service is configured to retrieve configuration parameters from a database. The configuration parameters define a security association for the encrypted communication channel and include an encryption key and an identifier of an encryption algorithm. The provisioning service is configured to transmit the configuration parameters to the endpoint node for use in implementation of a security association for the encrypted communication channel.

19 Claims, 6 Drawing Sheets

SECURITY ASSOCIATION MANAGEMENT

BACKGROUND

Numerous protocols are available for controlling communications across networks. By adhering to standard protocols, disparate computers and networks designed by the same or different entities can exchange packets with each other in a controlled manner. Some networking protocols cause the packets to be transmitted across a network to be encrypted by the source node (i.e., the source of the packet) and decrypted by the destination node (i.e. the recipient of the packet). The encryption and decryption of packets generally includes the use of encryption keys. The Internet Key Exchange (IKE) protocol facilitates the establishment of security associations between the nodes. The IKE protocol uses certificates for authentication of the nodes and a Diffie-Hellman key exchange to set up a shared session secret from which the cryptographic keys can be derived by the nodes.

BRIEF DESCRIPTION OF THE DRAWINGS

For a detailed description of various examples, reference will now be made to the accompanying drawings in which.

DETAILED DESCRIPTION

The IKE protocol noted above is a two-phase protocol that uses User Datagram Protocol (UDP) packets to exchange information to establish a security association between peered nodes across a network (e.g., the Internet). The IKE protocol includes two phases: Phase I and Phase II. In Phase I, the protocol establishes a secure authenticated communication channel using the Diffie-Hellman key exchange algorithm to generate a shared secret key to encrypt further IKE communications. Authentication may be performed using a pre-shared key (shared secret), digital signature, or public key encryption. During Phase II, the two IKE peers (e.g., source and destination nodes) use the secure channel established in Phase I to negotiate security associations on behalf of other services such as Internet Protocol Security (IPSec). The negotiation results in two unidirectional security associations—one inbound and one outbound. Each security association includes an encryption key used to encrypt and/or decrypt packets. The Diffie-Hellman and IPSec encryption keys are rotated periodically for added security by performing either or both of the Phase I and Phase II operations.

As noted above, the IKE protocol uses UDP packets. UDP, however, can be unreliable in that the UDP does not guarantee packet delivery or proper packet ordering and may not detect duplicate packets. It is also possible that one node erroneously believes the other node has a certain encryption key (e.g., the key was never installed correctly, was installed correctly but then deleted due to local device problems, etc.). As a result of the unreliability of the UDP protocol, the IKE protocol also is somewhat unreliable.

In accordance with the disclosed embodiments, a provider network (e.g., an organization, such as a company, that offers web services) includes a management service which is accessible by users of the provider network. The management service exposes a secure web application programming interface (API) frontend to accept security association (SA) creation, deletion and description requests. An API request to create an SA may include various parameters that define the SA itself. The management service responds to API requests to create an SA through interaction with an SA provisioning service. The SA provisioning service receives the SA parameters from the request and downloads them to a virtual machine in the provider network that is configured to implement the functionality of one end of an encrypted communication channel. The configuration parameters included in the SA creation request may include source and destination internet protocol (IP) addresses, an encryption key, an encryption algorithm, an authentication key, authentication algorithm, and other parameters as desired. The disclosed embodiments thus may not perform the IKE protocol over UDP packets to create security associations between peered nodes. Instead, the disclosed embodiments use customer-initiated API requests and provisioning infrastructure built into the provider network to generate security associations. Because the security associations are not created using generally UDP with its unreliability as noted above, security associations can be created with increased reliability.

Figure 1:
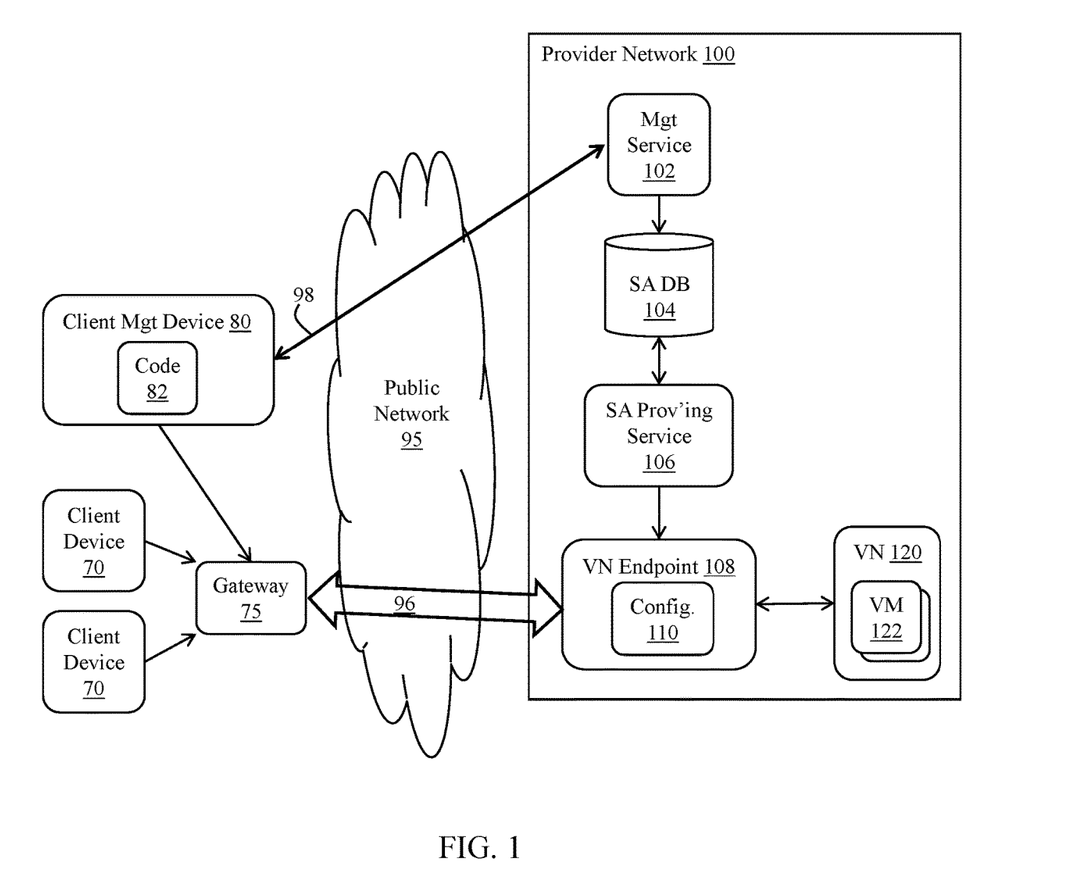
FIG. 1 shows a system in accordance with various examples.

FIG. 1 illustrates a provider network 100 accessible by client devices 70 and a client management device 80 via a public network 95. In some embodiments, the public network 95 comprises the Internet and may include one or more of local area networks, wide area networks, wired networks, wireless networks, etc. The client devices 70 may comprise any suitable type of compute device such as a personal computer (e.g., desktop computer, notebook computer, etc.), smart phone, or any other type of network-connected device. The client devices 70 and client management device 80 may be part of a customer datacenter or other collection of customer-related equipment. Further, each customer may have its own set of client devices 70 and client management devices 80, which can access the provider network 100 via the public network 95. While two client devices 70 and one client management device 80 are illustrated in FIG. 1, any number of such devices may be implemented in other examples.

The provider network 100 in the example of FIG. 1 may include a management service 102, a security association (SA) database 104, an SA provisioning service 106, a virtual network (VN) endpoint 108, and a virtual network (VN) 120. Each VN 120 may comprise one or more virtual machines 122 that have been created by a customer for use by that customer. The customer may interact with the management service 102 (e.g., via client management device 80) to request the management service to create the virtual machines. The management service 102, which may be implemented on a server computer ("server"), may respond to the customer's request to create virtual machines by forwarding the request to a provisioning service (e.g., the SA provisioning service 106 or other type of provisioning service). The provisioning service may select physical servers on which to load machine images that match the requirements contained in, or referenced by values contained in, the customer's virtual machine launch request (e.g., number of processing units, amount of memory, type of operating system, etc.).

A virtual machine is a software implementation of a physical computer system. Virtual machines may provide for multiple and/or different operating system environments to run concurrently on a single host computer. In one example, multiple virtual machines running a Linux® operating system environment may execute concurrently with virtual machines running instances of a Microsoft® Windows® operating system environment on a single physical computer. A virtual machine may interact with a hypervisor or a virtual machine monitor (or other type of virtualization system) which are programs that execute on the physical computer that allow multiple guest operating systems to share a single hardware host. Each virtual machine operating system appears to have exclusive access to the host's processor, memory, and other resources. However, the hypervisor controls the host processor and resources, allocating resources that are needed to each virtual machine's operating system in turn and ensuring that the guest operating systems of the virtual machines do not disrupt each other. Each virtual machine may be controlled by a respective customer. The virtual machines created by the customer can be loaded by the customer with whatever customer-specific applications the customer so chooses. For example, the customer's applications may comprise web server applications, data processing applications, or any other type of functionality that the customer desires. The applications executing within the VN endpoint virtual machines may be pre-stored in the machine images used to boot such virtual machines or may be loaded into the virtual machines post-boot by a provisioning service.

The customer also can request that some or all of that customer's virtual machines form a VN 120. A VN comprises a logical network of virtual machines for a particular customer. A customer has control of the virtual networking environment, including selection of IP address range, creation of subnets, and configuration of route tables and network gateways. FIG. 1 shows a VN 120 that includes a group of virtual machines 122. A VN for a customer may be implemented over one or more intermediate physical networks that interconnect host computers on which the customer's virtual machines execute. That is, a virtual network may be implemented over a physical network. Each customer may have their instances operating within a virtual network. A virtual network uses virtual IP addresses and servers hosting these virtual machines use corresponding physical IP addresses. The implementation of a virtual network may include modifying or adding additional headers to packets to map virtual addresses consistent with the virtual network to physical addresses associated with the underlying physical network so that the packets can be routed through the physical network between host computers. Each of the host computers that implement a customer's VN (e.g., VN 120) may include a communication manager that may modify outgoing packets destined for a virtual IP address of another virtual machine 122 within the customer's VN 120 based on the physical IP addresses used within the provider network. For example, if a communication packet is to be sent between computing nodes in the service provider's network, the originating packet may include an IP address in accordance with a particular protocol (e.g., IPv4), and a virtual machine communication manager associated with the sending host computer embeds the virtual network packet into a substrate network packet which includes physical source and destination IP addresses. The virtual machine communication manager then transmits the packet through an internal network (e.g., switches, routers, etc.) of the provider network. A virtual machine communication manager associated with the receiving host computer receives the substrate packet, extracts the virtual network packet and forwards the virtual network packet on to the targeted virtual machine.

A mapping service may be provided to store, update and provide virtual-to-physical address mappings for use in modifying packets to be transmitted between virtual machines 122 in a VN 120. The virtual network may be implemented in various ways in various embodiments, such as by using IPv4 ("Internet Protocol version 4") or IPv6 ("Internet Protocol version 6") packets as the overlay network packet size. For example, virtual network address information for a virtual network could be embedded in a larger physical packet network address space used for a networking protocol of the one or more intermediate physical networks. As one illustrative example, a virtual network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions, or otherwise modifying such data transmissions to translate them from a first networking protocol for which they are configured to a distinct second networking protocol. In other embodiments IPv4 packets could be used by the physical network and the virtual network. For example, the size of the IPv4 packet generated by the virtual machine could be limited to a size that can be inserted into an IPv4 packet and leave enough bits so the service provider can add headers to the packet.

The customer also may request the management service 102 to create the VN endpoint 108 and to attach the VN endpoint to the customer's VN 120. The VN endpoint 108 may be implemented as an application executing with a virtual machine which itself executes on a server. The VN endpoint 108 provides connectivity between the virtual machines 122 of the VN 120 and remote client devices 70 via the client's gateway 75 over a secure communication channel 96. Packets transmitted across the secure communication channel 96 may be encrypted. The communication channel 96 may be a bi-directional communication channel in which outgoing packets from the customer's VN 120 targeting client devices 70 are encrypted by the VN endpoint 108 and then decrypted by the receiving gateway 75, and packets in the reverse direction are similarly processed (i.e., encrypted by the gateway 75 and decrypted by the VN endpoint 108). In some embodiments, the communication channel comprises a tunnel over which packets may be encapsulated. In some case, the tunnel may implement the Internet Protocol Security (IPSec) which implements encryption functionality. In other embodiments, the communication channel does not implement packet encapsulation, but still implements packet encryption and decryption. Thus, broadly the communication channel may implement an encrypted tunnel (e.g., an IPSec tunnel), transport layer security (TLS), secure sockets layer (SSL), etc.

The VN endpoint 108 may include configuration parameters 110 that define a security association applied for implementation of the secure communication channel 96. Such configuration parameters 110 may include encryption keys, source and destination internet protocol (IP) addresses, etc. as explained below. Such configuration parameters may be included in a request for creation of a security association generated using the client management device 80 and provided to the management service 102.

The management service 102 may comprise one or more services that collectively permit customers of the provider network 100 to perform various management functions such as the creation of virtual machines 122 and VNs 120, configuration and/or termination of such virtual machines and VNs, allocation of support services (e.g., storage services, database management services, etc.) that the provider network 100 offers to the customers, etc. The management service 102 may comprise one or more servers that execute management software that performs various functions. One such function is to receive requests from customers via, for example, client management devices 80 to create and manage security associations. The SA creation requests may be submitted from the management devices 80 in the form of API calls that contain various parameters that define some or all of the security association. The API calls may be submitted through a command line interface, as part of a script file containing one or more API calls, etc. In other embodiments, a customer may submit such SA-related requested from a graphical console generated by the management service 102 and rendered on a display of the client management device 80 in, for example, a web browser. Interaction with the graphical console causes the management service 102 to generate API calls to implement the functionality desired by the customer.

The communication link 98 between the client management device 80 and the management service 102 may implement security so that the parameters provided by the customer to the management service 102 of the provider network are protected. In some implementations, the Secure Sockets Layer (SSL) protocol may be applied to the communication link 98. Additional or other types of security protocols and measures may be implemented to protect the information submitted by the customer over link 98 to create and manage security associations.

Customers may submit API calls which may include a CreateSA( ) API, a DescribeSA( ) API, and a DeleteSA( ) API. The API calls, or at least their arguments, may be stored in the SA database 104 pending execution of the API calls by the SA provisioning service 106, which also may be implemented on a server. The CreateSA( ) API permits a customer to create a security association. A call to this API may include various parameters including a mode designation, inbound SA parameters, outbound SA parameters, a replay window size, a valid start time, and a valid end time. The mode designation may include an encapsulation mode such as Encapsulating Security Payload (ESP) and Network Address Translator Traversal (NAT-T). ESP is a member of the IPSec protocol suite and provides origin authenticity, integrity and confidentiality protection of packets. ESP also supports encryption-only and authentication-only configurations. NAT-T is a technique for establishing and maintaining internet protocol connections across gateways that implement network address translation The inbound SA parameters may include one or more of:
Source IP address: the IP address of the source end of the communication channel
Destination IP address: the IP address of the destination end of the communication channel
Encryption key: used to encrypt and/or decrypt packets. In some embodiments, a seed value is included in the SA parameters, and the node implementing the security association may calculate the encryption key from the seed value.
Encryption algorithm: the algorithm used to encrypt packets (e.g., Advanced Encryption Standard such as AES-256, etc.). This value parameter may be an identifier of the encryption algorithm
Authentication algorithm: the algorithm (e.g., SHA-256) used to authenticate the node that implements the SA. This value parameter may be an identifier of the authentication algorithm
Authentication key: pre-shared secret key used to authenticate the peered node
Security Parameter Index (SPI): identification tag added to the header while using IPSec for tunneling IP traffic. The tag helps to differentiate between multiple traffic streams where different SAs (and thus different encryption keys) may apply The parameters for the outbound part of the tunnel may largely be the same as that listed above (or different) as the inbound parameters. In general, the source and destination IP addresses are reversed.

The replay window size parameter is a value that may indicate the size of the replay window to use. The replay window may be defined as a preconfigured count of packets. Each packet may be assigned a monotonically increasing sequence number. As such, packets transmitted back and forth between the VN endpoint node 108 and the gateway 75 have different (and monotonically increasing) sequence numbers (e.g., 1, 2, 3, 4, etc.). The sequence numbers may be inserted into, for example, Transmission Control Protocol (TCP) packet headers. Absent packet retransmissions, which may occur due to an error occurring during a packet's transmission, different packets should normally have different sequence number. A replay attack is a form of a network attack in which a valid data transmission is maliciously or fraudulently repeated. The replay window defined by the customer as part of the CreateSA( ) API call may cause the VN endpoint 108 to compare the sequence number of each incoming packet to the highest sequence number already received. The VN endpoint 108 may reject a packet whose sequence number does not lie within the defined replay window. For example, if the replay window is 5, and the highest received sequence number thus far is 45, the VN endpoint 108 will reject a packet whose sequence number is less than 40.

A security association defined by the parameters in the CreateSA( ) API call may be valid only between a specified start time and an end time. The valid start time defines the time after which the SA (and its encryption key) will be valid and the valid end time defines the time at which the SA and its key will become invalid.

In some embodiments, the client management device 80 includes code 82 that is executed thereon. The code 82 may be provided by (e.g., downloaded from) the provider network and contain or otherwise have access to plug-ins that are specific to different types of gateways 75. The code 82 also may include credentials usable to access the customer's service provider account. The credentials may include, for example, a customer name or other of identifier, a password, an account number, etc. Using these credentials, the code 82 may submit the various API calls described herein (e.g., the CreateSA( ) API call, the DescribeSA( ) API call, and the DeleteSA( ) API call) to manage security associations within the VN endpoint 108 for the customer's communication channel 96, as well as manage the client-side security associations on the gateway 75. The management service 102 may authenticate the customer using the credentials included with each such API call. A customer can interact with the code 82 (e.g., via a graphical user interface, command line interface, etc.) to request a new security association to be created. The customer specifies the various parameters for his or her security association (e.g., the parameters listed above). The code 82 submits a CreateSA( ) API call across communication link 98 as well as load the corresponding parameters in gateway 75. The code 82 may be configured to perform the security association creation and management functions described herein at configurable periods of time (e.g., every hour, 8 hours, etc.).

In some embodiments, the code 82 may run on the same physical compute device as the gateway 75. That is, the gateway 75 may execute code 82 that loads security association parameters locally in the gateway as well as transmit CreateSA( ) and the other types of SA-related API calls across the public network 95 to the management service 102.

In other embodiments, the code 82 may execute on a separate compute device (e.g., client management device 80 illustrated in FIG. 1). At configurable events (e.g., configurable time periods), the code 82 may submit a CreateSA( ) API call to the management service 102 as well as submit a message locally to gateway 75 to install the security association on the gateway. Further, to the extent the customer has multiple secure communication channels 96 to resources the customer uses in the provider network 100, the customer may use the gateway 75 to establish multiple secure communication channels 96 (or have separate gateways 7) and code 82 may separately configure each such secure communication channel 96 with different security association parameters (encryption keys, encryption algorithms, etc.). Such code 82 may be configured to have different triggering events to trigger the creation/change of the various security communication channels 96. For example, for one security communication channel 96, the code 82 may submit CreateSA( ) API calls to change the encryption key every 2 hours, but every 8 hours for a different security communication channel 96.

Once the management service 102 receives a CreateSA( ) API call, the management service 102 stores the API call, or at least the arguments contained in the API call, in the SA database 104. The SA database may comprise multiple records, and each record may be associated with a particular security association. When the management service 102 receives a CreateSA( ) API call, the management service 102 adds a record to the SA database 104 into which it stores the corresponding parameters from the API call. The management service 102 also may assign a unique identifier to the security association (referred to herein as the security association identifier (SAID)). The SAID also may be added to the record. The SA database 104 may be used as a temporary buffer to store requests to create security associations pending their execution by the SA provisioning service 106.

A given SA (as defined by its SAID) may have any one of multiple status designators including, for example, pending, active, inactive, and deleted. The DescribeSA( ) API returns the state of a security association identified in the API call. The input parameter to the DescribeSA( ) API may be the SAID of the security association whose status is desired. Code 82 executing in the customer's client management device 80 also may be used to obtain the status of the client-side security association(s). The client management device 80 may store a mirror copy of the SA database 104, although containing just the security associations for that particular customer. The pending status may mean that a security association in the SA database 104 is in the process of being installed on a VN endpoint 108, but the installation process has not yet completed. The active status may mean that the security association is installed on the VN endpoint 108 and is active to encrypt and decrypt packets or perform other tasks associated with the VN endpoint. The inactive status may mean that the security association is not installed on a VN endpoint and is not in the process of being installed. For example, the start time for a security association be in the future (e.g., two days away) and thus the system will not install the security association for another two days. The deleted status may mean that a security association is to be, or has been, removed from further use, regardless as to whether the security association was otherwise actively being used, being installed or is awaiting a future installation on a VN endpoint.

The DeleteSA( ) API causes a security association to be deleted. The input argument to this API call is the SAID of the security association to be deleted. In response, the management service updates the status designation in the record in the database corresponding to the specified SAID to specify that the security association is to be deleted. The provisioning service then responds to the updated status designation by sending a message to the corresponding VN endpoint to delete or deactivate its security association parameters. The code 82 also may delete the corresponding client-side security association from gateway 75.

As noted above, one of the CreateSA( ) API call parameters may be a valid end time. Once the end time for an active security association (as specified in the database) is reached, the provisioning service may submit a message to the corresponding VN endpoint to delete or deactivate its security association parameters.

The SA database 104 is used to store SA-related API requests, which may have been received by the management service 102 from customers (e.g., via client management devise 80). At least some of the API requests are retrieved and executed by the SA provisioning service 106. As noted above, a CreateSA( ) API call may include a valid start time as one of its input arguments. The SA provisioning service 106 may periodically examine the records in the SA database and determine if any of the valid start times have been reached, or are about to be reached (e.g., within a threshold period of time). At or near (e.g., within the time threshold) the valid start time specified in a request to create a security association, the SA provisioning service 106 retrieves the arguments from the API request that have been stored in the database and that define the security association and loads the arguments in the corresponding VN endpoint 108 as configuration data 110. An API call to the corresponding VN endpoint may be generated to include the arguments. In other embodiments, the SA database 104 may be part of a database service that is capable of monitoring its own records for records whose valid start times have been reached, or are about to be reached, and sends a message to the SA provisioning service 106 of such a condition. The SA provisioning service 106 then may proceed as explained above to load the VN endpoint 108 with configuration data 110 about the security association. The client management device 80 may have a mirror copy of the customer's security associations and may cause to be installed the corresponding security association in gateway 75 upon occurrence of the valid start time.

Figure 2:
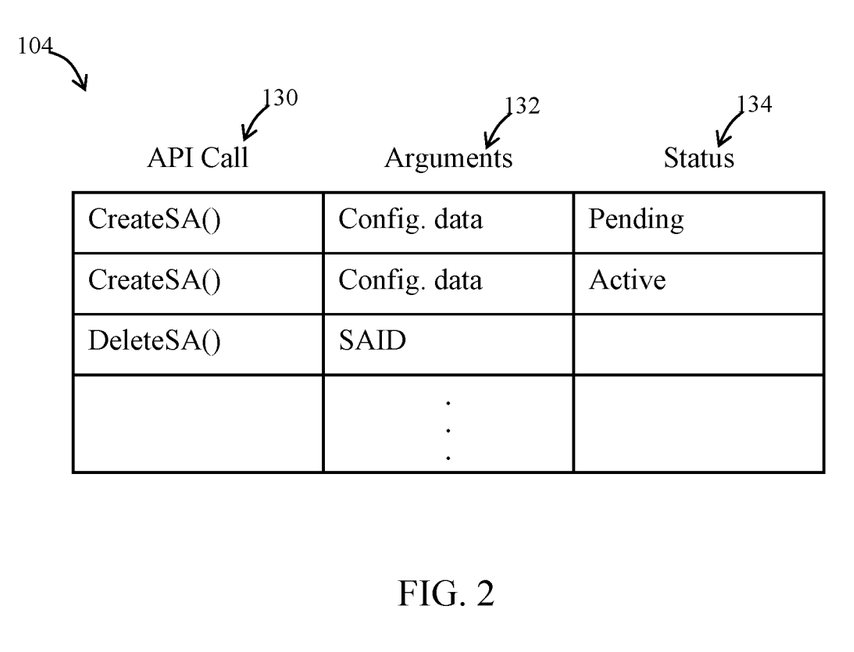
FIG. 2 shows an example of a security association database in accordance with various examples.

FIG. 2 illustrates an example of an implementation of the SA database 104. The database includes multiple records as shown and each record may include the name of an API call 130 such as a CreateSA( ) API, a DeleteSA( ) API, a DescribeSA( ) API, etc. the arguments 132 of the API call, and the status 134 of the API call. In the example of FIG. 2, the first two records include CreateSA( ) APIs. The arguments 132 for these API calls include the parameters included in the API call requests themselves (e.g., source IP address, destination IP address, encryption key, etc.). The CreateSA( ) API call also may include an identifier of the VN endpoint 108 to which the security association corresponds. As such, the arguments 132 in the database also may include identifier of the VN endpoint 108. The status 134 of the first CreateSA( ) API is pending meaning that the corresponding security association is being installed on a VN endpoint, but the installation process has not yet completed. The status of the second CreateSA( ) API is active meaning that its security association has been loaded into the corresponding VN endpoint and is active to encrypt and decrypt packets across a tunnel 96. The third API call in this example is a DeleteSA( ) API and its arguments 132 includes the SAID of the security association to be deleted.

To load the security association configuration data into a VN endpoint, the SA provisioning service 106 may submit a message (e.g., an API call) to the server on which the VN endpoint 108 executes and the message may contain the configuration data for the security association. Alternatively, the message may indicate to the VN endpoint 108 that security association configuration data is available to be downloaded with an indication as to where the VN endpoint is to obtain the configuration data (e.g., an identifier of a record in the SA database 104). In either case, the configuration data is loaded into storage in the VN endpoint and applied to implement the security association with respect to the tunnel 96. For instance, the encryption algorithm referenced in the configuration data 110 may cause a particular section of code to run to perform the targeted encryption processes or load particular values into high level encryption code to customize it for the desired encryption algorithm.

In the example of FIG. 1, the customer has created a VN 120 comprising multiple virtual machines 122 and a VN endpoint 108 for establishing an encrypted tunnel to a remote gateway 75 over a public network. The customer has also created the security association for the tunnel. In other embodiments, the customer may use the management service 102 to establish a security association for tunnels between remote nodes such as gateways 75 and provider network entities other than VN endpoints (e.g., for a virtual machine other than a virtual machine that functions as a VN endpoint for a VN 120). For example, the security association created by the customer may be applied to a virtual machine that also executes customer-specific application software as well as implements an encrypted tunnel 96 to a remote gateway 75. In yet other embodiments, the VN endpoint 108 may function as an endpoint for one or more virtual machines 122 that are not themselves part of a VN 120.

Figure 3:
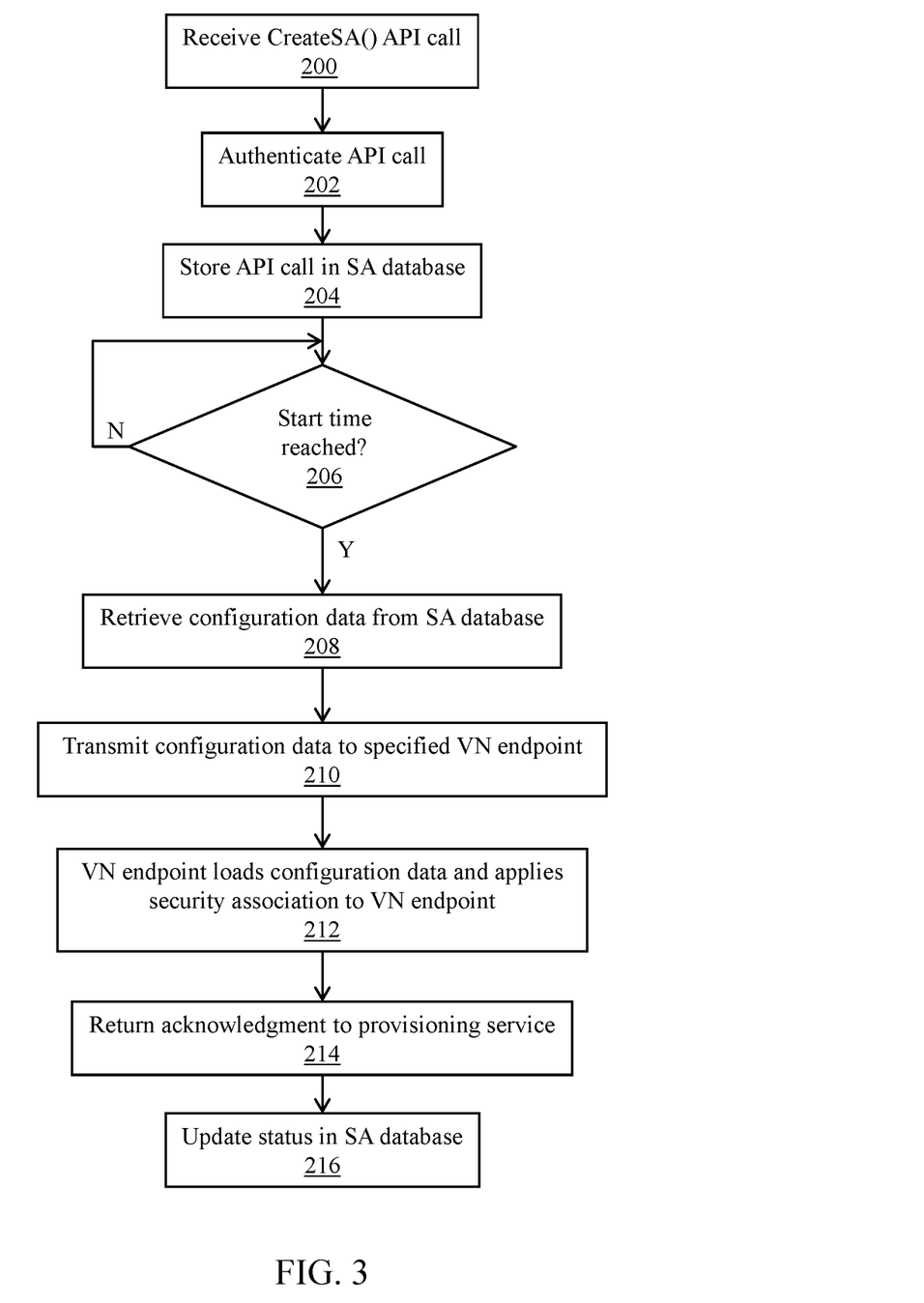
FIG. 3 shows a method of creating a security association in accordance with various examples.
Figure 4:
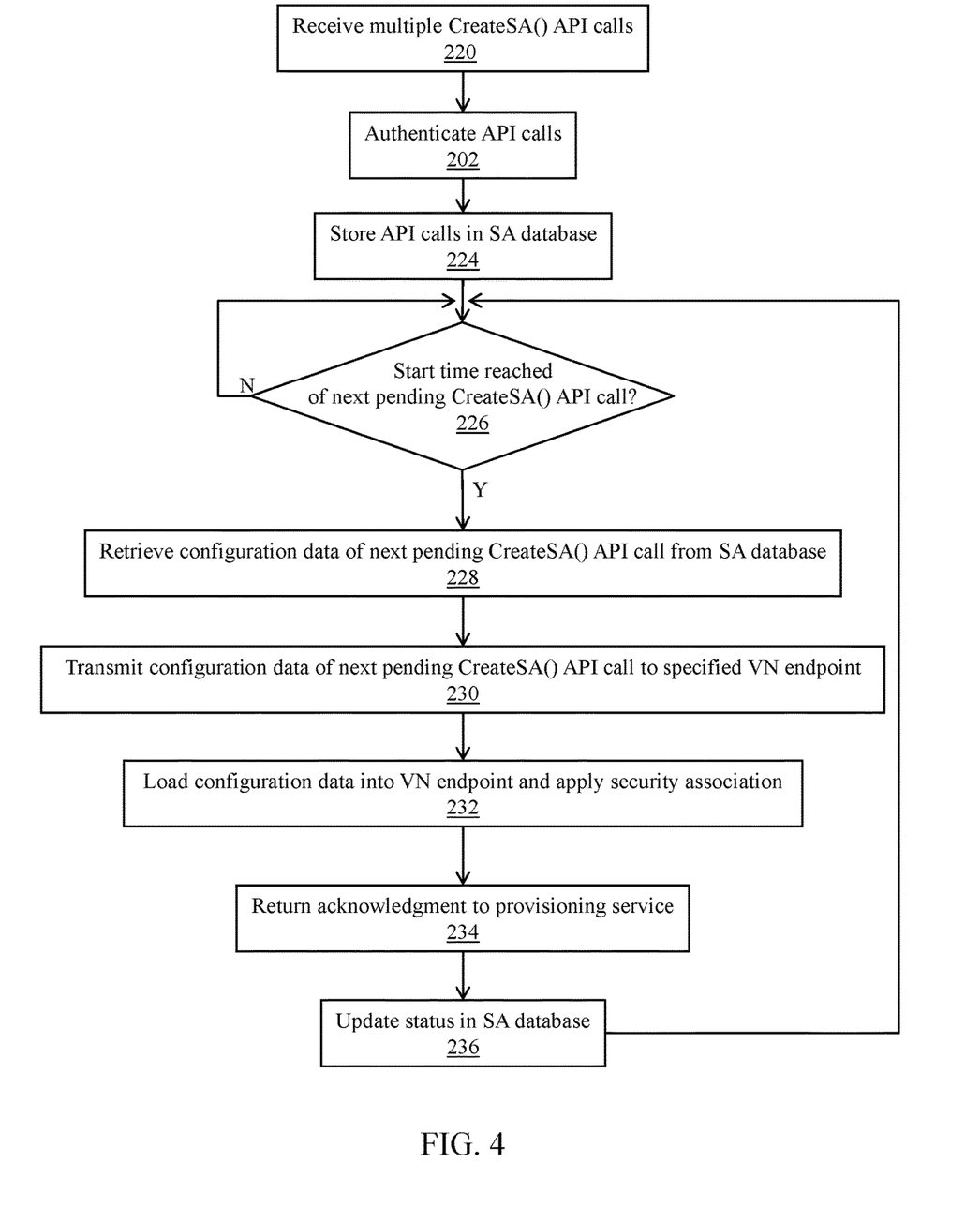
FIG. 4 shows an alternative method of creating security associations.
Figure 5:
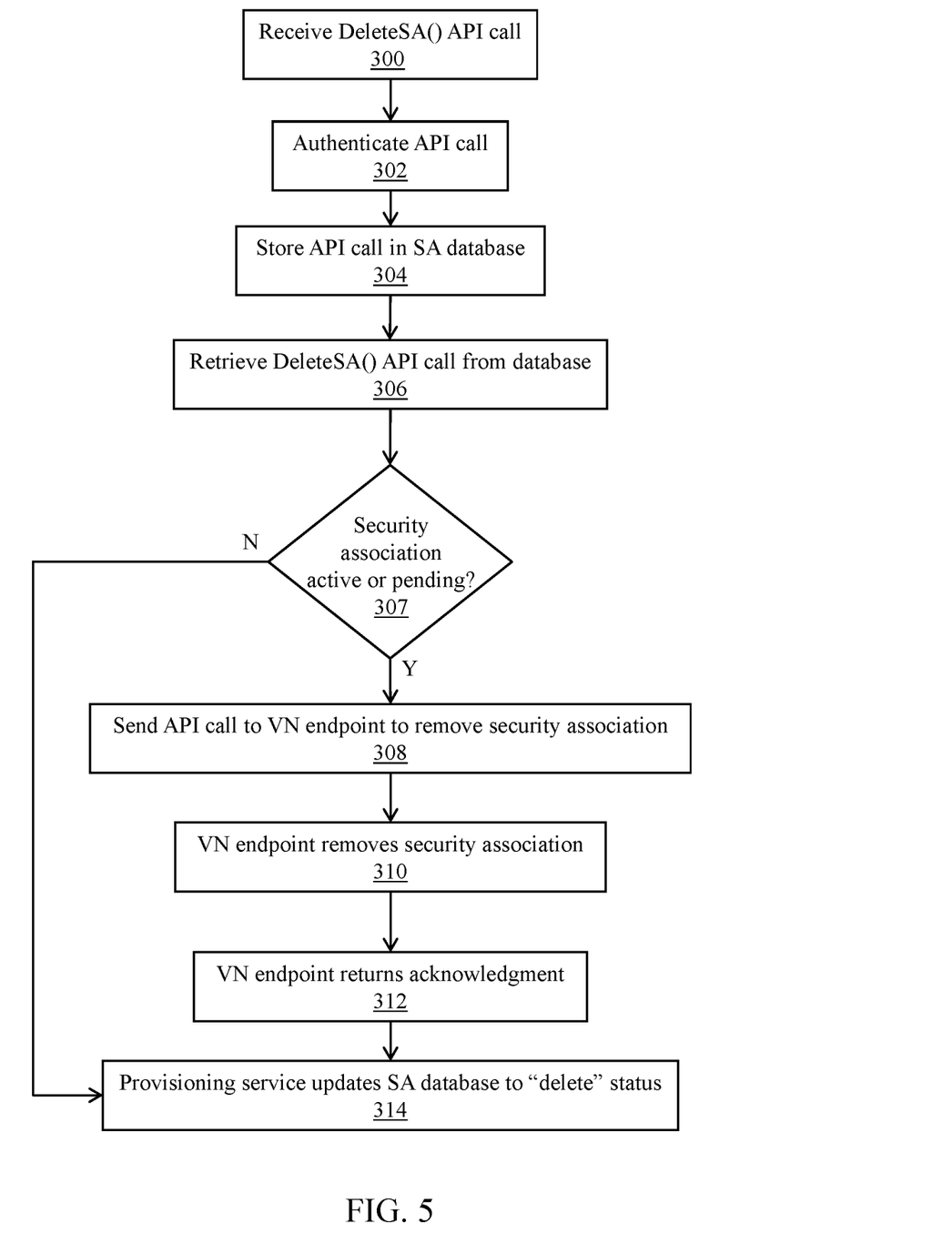
FIG. 5 shows a method of deleting a security association in accordance with various examples.

FIGS. 3 and 4 include flow charts depicting examples of methods of creating security associations in accordance with various embodiments and FIG. 5 shows an example of a method for deleting security associations. The operations may be performed in the order shown, or in different orders. Further, the operations may be performed sequentially or two or more of the operations of a given method may be performed concurrently.

Referring to FIG. 3, at 200 the method includes receiving a CreateSA( ) API call. This API call may be generated by a customer using a client management device 80 and received by the management service 102. The API call may be generated via a command line interface on the client management device 80, as part of a script of API calls submitted by the client management device, or via a graphical user interface such as that rendered by a browser executing on the client management device based on web pages provided the management service 102. The CreateSA( ) API call may have one or more of the parameters listed above suitable for creation of a security association.

At 202, the management service 102 may authenticate the CreateSA( ) API call. In some embodiments, the API call may contain a credential (e.g., a password, digital signature, etc.) that is authenticated by the management service. The API call is dropped (e.g., deleted, ignored, etc.) if it is not successfully authenticated. Otherwise, the CreateSA( ) API call is added to the SA database at 204 following in additional authentication and decryption tasks performed on the arguments of the API call (e.g., the arguments may be submitted in encrypted form and are decrypted upon receipt by the management service). FIG. 2 provides an example of records in the SA database that contain CreateSA( ) API calls. Initially, the status of the record containing the new CreateSA( ) API call is set to "pending" by the management service to signify that it is to be processed and activated at the appropriate time by the SA provisioning service 106.

At 206, method comprises determining whether the current time has reached, or is about to reach, the valid start time included in the CreateSA( ) API call and stored in the SA database 104 as an argument 132 for the API call. In some embodiments, determination operation 206 determines whether the current time is within a preconfigured period of time (e.g., 1 minute, 2 minutes, etc.) of the valid start time. In some embodiments, the SA provisioning service 106 may examine all of the records in the SA database 104 that contain CreateSA( ) API calls every X period of time (e.g., X is 30 second, 1 minute, etc.) and determine whether the start time specified in any of the CreateSA( ) API calls has been reached. In other implementations, a daemon process may run local to the SA database that performs this function and sends a message to the SA provisioning service when a start time triggering event has been detected.

When the valid start time has been reached per 206, then at 208 the method includes retrieving the configuration data (e.g., arguments 132) from the SA database for the corresponding CreateSA( ) API (to the extent such information has not already been retrieved to detect the occurrence of the valid start time). The SA provisioning service 106 then transmits at 210 the configuration data to the VN endpoint 108 to which the CreateSA( ) API is associated. The particular VN endpoint may submit the configuration data as arguments of an API call, or in other manners to the VN endpoint. At 212, the configuration data may be loaded into the VN endpoint (e.g., into memory or registers) as configuration 110 and then the security association defined by the configuration data may be applied to the VN endpoint. For example, the configuration data may specify a type of encryption algorithm to be used and the corresponding code with the VN endpoint 108 may be loaded to perform that particular algorithm, or specific encryption parameters may be generated based on the encryption type specified in the configuration data to cause the VN endpoint to perform the desired encryption algorithm. When the VN endpoint receives an encrypted packet from the tunnel 96, the encryption key included as part of the configuration data may be accessed and used to decrypt the packet, or encrypt outgoing packets to be transmitted across the tunnel 96.

At 214, the VN endpoint 108 may return an acknowledgment packet to the SA provisioning service 106 confirming receipt of the configuration data defining the security association. Responsive to the SA provisioning service 106 receiving the acknowledgment from the VN endpoint 108, the SA provisioning service may update the status of the corresponding security association in the SA database 104. The status, for example, may be changed from "pending" to "active".

In the embodiment of FIG. 3, a CreateSA( ) API call may be provided to the management service and loaded into the SA database for execution by the SA provisioning service 106 whenever the customer wants to create or change a security association. That is, if the customer wants to change the encryption key, the customer can submit a new CreateSA( ) API call containing the new encryption key along with the start time at which the new security association is to be installed and made active, and the SA provisioning service will change the security association on the relevant VN endpoint at the valid start time. Thus, if the customer wants to periodically change the encryption key for a particular secure tunnel 96, the customer submits a new CreateSA( ) API call at each periodic interval.

FIG. 4 shows another embodiment for creating security associations. In the embodiment of FIG. 4, a customer can preload the SA database with multiple CreateSA( ) API calls for the same VN endpoint. Each CreateSA( ) API call may have different valid start and end times and different encryption keys and/or other security association parameters. For example, if the customer wants the security association changed once per day, the customer could load 365 different CreateSA( ) API calls in the SA database which would include a different security association for each day for the next year. Each day in this example, the SA provisioning service 106 may load the security association whose valid start time coincides with that day. While the valid start and end times of each CreateSA( ) API call may vary, some time overlap may exist between CreateSA( ) API calls that define security associations to be implemented sequentially in time. That is, the valid start time for one security association may precede the valid end time of the preceding security association.

At 220 in FIG. 4, the method includes receiving multiple CreateSA( ) API calls. As was the case for operation 200 in FIG. 3, the CreateSA( ) API calls may be received by the management service 102 in a variety of manners (via command line interfaces, scripts, graphical consoles, etc.). Each of the multiple CreateSA( ) API calls is then authenticated at 222 as explained above and then stored at 224 in the SA database 104. The CreateSA( ) API calls may be stored as separate records in the SA database. The CreateSA( ) API calls and their arguments thus may be loaded into the database before the security associations defined by each API call's arguments are loaded into the corresponding VN endpoint.

At 226, the method determines whether a valid start time of any of the CreateSA( ) API calls in the preloaded set of API calls has been reached, or is about to be reached. The SA provisioning service 106 and/or another software daemon may make this determination. Once this condition is detected, the configuration data is retrieved from the SA database at 228, transmitted to the specified VN endpoint at 230 and loaded into the VN endpoint at 232. The security association is then applied to the VN endpoint much as described above. An acknowledgment message may be returned to the SA provisioning service at 234 which updates at 236 the corresponding record in the SA database 104. Control then loops back to 226 and the SA provisioning service 106 (or other software daemon) again waits for the occurrence of the next valid start time in a security association for the VN endpoint.

FIG. 5 illustrates a method for deleting a security association. A security association can be deleted for a variety of reasons. For example, the customer may want to deactivate the secure tunnel 96. The customer may want to reconfigure the tunnel for a different security association, but has not yet generated the new security association.

At 300, the method includes receiving a DeleteSA( ) API call. The argument within the DeleteSA( ) API call may comprise the SAID of the security association to be deleted. As described above, the management service 102 may receive the DeleteSA( ) API call and do so from a client management device 80 (e.g., via a command line interface, script file containing the DeleteSA( ) API call, graphical console, etc.). The DeleteSA( ) API call may be authenticated at 302 as described previously and stored at 304 in the SA database 104.

At 306, the SA provisioning service 106 may retrieve the record from the SA database 104 containing the DeleteSA( ) API call and its argument(s) (e.g., the SAID). The security association's current status may be inactive, pending, or active as explained above. If the security association is currently active on a VN endpoint, the security association is removed from the corresponding VN endpoint. If the security association is in a pending state, then at least some of the parameters of the security association may have been provided to the VN endpoint and such parameters should be removed from the VN endpoint. Operations 308-314 illustrate the work flow to delete a security association that is partially or fully installed on a VN endpoint. If, however, the security association is currently inactive, which means the security association is not installed partially or completely on a VN endpoint, then its status is changed from inactive to deleted (operation 314).

At 308, the SA provisioning service may generate and submit a message (e.g., an API call) to the VN endpoint 108 containing the security association to be deleted. The message contains a request to remove the security association from the VN endpoint. At 310, the VN endpoint removes the security association as requested. This operation may be performed by deleting or marking as invalid configuration 110, which contains those security association parameters that have been stored on the VN endpoint 108. At 312, the VN endpoint 108 returns an acknowledgment message back to the SA provisioning service 106 to indicate that the security association parameters have been removed. The SA provisioning service 196 then may update the record in the SA database 104 for the security association to designate the security association as "deleted." If the security association was in the inactive state as determined at 307, the work flow of operations 308-312 is bypassed and operation 314 is performed.

Figure 6:
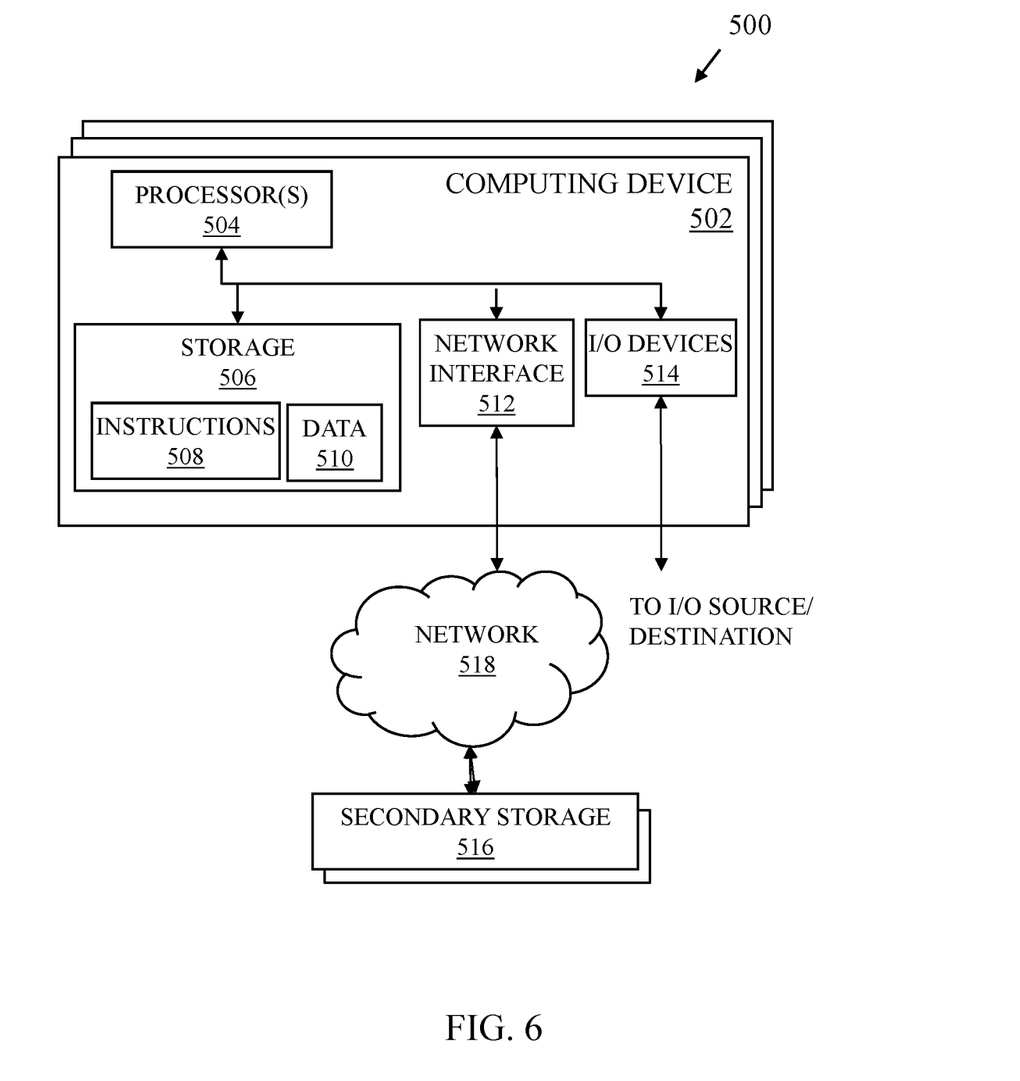
FIG. 6 shows a block diagram of a computing device in accordance with various examples.

FIG. 6 shows a schematic diagram for a computing system 500 suitable for implementation of any of the virtual machines (e.g., virtual machines 122), the management service 102, SA provisioning service 106, the VN endpoint 108, the SA database 104 as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various services described herein.

Each computing device 502 includes one or more processors 504 coupled to a storage device 506, network interface 512, and 110 devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 100, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processor(s) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the virtual machines, the management service 102, the SA provisioning service 106, the SA database 104 and other components described herein may be implemented as a separate computing device 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
    a virtual network endpoint node, including a memory coupled to a processor, wherein the virtual network endpoint node is configured to provide network connectivity to a virtual network which comprises a plurality of virtual machines created by a user, and wherein the virtual network endpoint node is configured to establish an encrypted communication channel over a public network;
    a management service, including a memory coupled to a processor, wherein the management service is configured to receive a plurality of create security association application programming interface (API) calls to create security associations for the virtual network endpoint node, each create security association API call containing configuration parameters defining a security association for the encrypted communication channel, the configuration parameters including an encryption key, a valid start time, and a valid end time;
    a provisioning service, including a memory coupled to a processor, wherein at or near the valid start time of one of the create security association API calls for the virtual network endpoint node, the provisioning service is configured to transmit the configuration parameters to the virtual network endpoint node for use in implementation of a security association for the encrypted communication channel; and wherein the provisioning service is configured to return an acknowledgment message indicative of a successful load of the security association on the virtual network endpoint node.

2. The system of claim 1 further comprising a database configured to store a plurality of records, wherein each record is configured to store, for a given security association, a security association identifier, the security association API call configuration parameters, and a corresponding status indicator for the security association.

3. The system of claim 2, wherein:
the management service is configured to store in the security association database configuration parameters for each of the plurality of create security association API calls for the virtual network endpoint node, wherein the valid start and end times for the respective security association are different between the plurality of create security association API calls.

4. The system of claim 1, wherein responsive to the acknowledgment message, the provisioning service is configured to update a status indicator in a database record to indicate that the security association is in an active state.

5. The system of claim 1, wherein the configuration parameters of the create security association API calls also include at least one of: a source internet protocol (IP) address, a destination IP address, an identifier of an encryption algorithm, an identifier of an authentication algorithm, an authentication key, a security parameter index, and a replay window size, wherein the valid start time in the configuration parameters indicates the time after which the encryption key is valid, the valid end time indicates the time after which the encryption key is invalid.

6. A system, comprising:
an endpoint node, including a memory coupled to a processor, wherein the endpoint node is configured to establish an encrypted communication channel over a public network;
a provisioning service, including a memory coupled to a processor, wherein the provisioning service is configured to retrieve configuration parameters from a database, the configuration parameters defining a security association for the encrypted communication channel, the configuration parameters including an encryption key and an identifier of an encryption algorithm, and wherein the provisioning service is configured to transmit the configuration parameters to the endpoint node for use in implementation of a security association for the encrypted communication channel; and
a management service, including a memory coupled to a processor, wherein the management service is configured to store in the database configuration parameters for each of a plurality of create security association application programming interface (API) calls for the same endpoint node, wherein each of the plurality of create security association API calls contains valid start and end times for a respective security association, wherein the valid start and end times are different between the plurality of create security association API calls, and
wherein, at or near the valid start time of each of the create security association API calls, the provisioning service is configured to load the configuration parameters for that create security association API call into the endpoint node.

7. The system of claim 6, wherein the configuration parameters also include an identifier of an authentication algorithm, an authentication key, a security parameter index, the valid start time indicating the time after which the encryption key is valid, the valid end time indicating the time after which the encryption key is invalid, and a replay window size.

8. The system of claim 6, further comprising a management service, including a memory coupled to a processor, wherein the management service is configured to:
receive a create security association API call to create a security association for the endpoint node; and
store the configuration parameters from the received create security association API call in the database.

9. The system of claim 6, wherein the management service is configured to:
receive a describe security association API call that includes a security association identifier as an input argument;
access the database to retrieve the record corresponding to the security association identifier; and
respond to the describe security association API call with a status identifier of the corresponding security association identifier.

10. The system of claim 6, wherein the management service is configured to receive a delete security association API call that includes a security association identifier as an input argument and update the record in the database corresponding to the security association identifier to specify that the security association is to be deleted, and wherein the provisioning service is configured to respond to the update to the record by transmission of a message to the endpoint node to delete its security association.

11. The system of claim 6, wherein the endpoint node comprises virtual network endpoint node configured to provide network connectivity to a virtual network, wherein the virtual network comprises a plurality of virtual machines.

12. The system of claim 6, wherein each load of configuration parameters defining a security association into the endpoint node overwrites previously loaded security association configuration parameters.

13. The system of claim 6, wherein the provisioning service is configured to return an acknowledgment message indicative of a successful load of the configuration parameters into the endpoint node, and wherein, responsive to the acknowledgment message, the provisioning service is configured to update a status indicator in the database to indicate that the security association is in an active state.

14. A computer-implemented method, comprising:
receiving an application programming interface (API) call including configuration parameters that define a security association for a secure communication channel over a network, the configuration parameters including an identifier of a virtual network endpoint node to implement the secure communication channel, start time specifying when the security association is to be valid, and an end time;
storing the configuration parameters of the API call in a database;
determining that the start time has been reached, or is within a threshold time period of being reached;
retrieving the configuration parameters from the database;

loading the configuration parameters into a storage device of the virtual network endpoint node; and returning, by the virtual network endpoint node, an acknowledgment indicating the configuration parameters have been loaded.

15. The computer-implemented method of claim 14, wherein the configuration parameters included in the API call also include at least one of an encryption key, a seed value, a source internet protocol (IP) address, a destination IP address, an identifier of an encryption algorithm, an authentication key, an identifier of an authentication algorithm, a security parameter index, and a replay window size.

16. The computer-implemented method of claim 14, further comprising:

responsive to the acknowledgment, updating a status indicator in the database for the indicating that the configuration parameters have been loaded into the virtual network endpoint node;

receiving a describe security association API call including, as an argument, a security association identifier corresponding to the configuration parameters; and responsive to the describe security association API call, returning the status indicator from the database.

17. The computer-implemented method of claim 14, wherein:

receiving the API call includes receiving a plurality of API calls, each received API call including a separate set of configuration parameters and each set includes the identifier of the virtual network endpoint node;

before loading any of the configuration parameters in the virtual network endpoint node, storing the configuration parameters includes storing each of the sets of configuration parameters in the database;

determining that the start time has been reached, or is within the threshold time period of being reached includes determining that the start of one of the sets of configuration parameters has been reached, or is within the threshold time period of being reached; and loading the configuration parameters into the virtual network endpoint node includes loading the configuration parameters containing the start time that has been reached, or is within the threshold time period of being reached.

18. The computer-implemented method of claim 14, further comprising:

receiving a delete security association API call that includes a security association identifier as an input argument;

updating the database to specify that the security association is to be deleted;

responsive to the update of the database, transmitting a message to the virtual network endpoint node to delete its configuration parameters that define its security association for the secure communication channel.

19. The computer-implemented method of claim 14, wherein the configuration parameters include an end time and the method further comprises:

determining that the end time has been reached; and transmitting a message to the virtual network endpoint node to deactivate the security association for the secure communication channel.

* * * * *